United States Patent [19]
Peck, Jr. et al.

[11] Patent Number: 5,809,187
[45] Date of Patent: Sep. 15, 1998

[54] MULTI-PORT NETWORK USING PASSIVE OPTICAL COUPLERS

[75] Inventors: James L. Peck, Jr.; Stephen W. Clausi, both of Huntington Beach, Calif.

[73] Assignee: Boeing North American, Inc., Seal Beach, Calif.

[21] Appl. No.: 839,994

[22] Filed: Apr. 24, 1997

[51] Int. Cl.⁶ ............................................. G02B 6/28
[52] U.S. Cl. .............................. 385/24; 385/22; 385/31; 385/44; 359/164
[58] Field of Search .................. 385/24, 36, 46, 385/22, 31, 39, 44, 47, 48; 359/109, 136, 152, 164; 250/227.24

[56] References Cited

U.S. PATENT DOCUMENTS

| | | | |
|---|---|---|---|
| 4,317,614 | 3/1982 | Palmer | 385/24 |
| 4,400,054 | 8/1983 | Biard et al. | 385/36 |
| 5,046,137 | 9/1991 | Kurobe et al. | 359/136 |

*Primary Examiner*—Phan T. H. Palmer
*Attorney, Agent, or Firm*—Steven E. Kahm; Tom Streeter; Harry B. Field

[57] ABSTRACT

This invention relates to fiber optic networks for the two way communication of light signals. One optic fiber may carry bidirectional signals to many nodes connected to the optic fiber by bidirectional passive optic couplers. Passive unidirectional to bidirectional passive optic couplers can bridge between bidirectional optic fiber networks and unidirectional fiber optic networks. Thus optical signals can be transported to and from each node to all other nodes such that each node is in contact with all the other nodes on the network.

13 Claims, 3 Drawing Sheets

MULTI-PORT NETWORK USING PASSIVE OPTICAL COUPLERS

BACKGROUND OF THE INVENTION

1. Field of the Invention

This invention relates to optical fiber networks for transmitting data, and more particularly to optic fiber networks with passive optic fiber connections.

2. Description of the Related Art

In the past fiber optic networks were dependent on bulky expensive star couplers, fragile fusion couplers or active (powered electronic) assemblies to link users together. The star couplers and fusion couplers are not capable of precisely splitting off a small amount of the light such that optical networks with many nodes can be formed.

Star Couplers and fusion couplers have large signal losses at each junction. The large signal losses require expensive, bulky and heavy powered node branches to make a network function.

SUMMARY OF THE INVENTION

Optical networks using passive optical connections can be built with the use of couplers having the ability to take out a small amount of the signal from the main signal at the junctions, thus preserving most of the signal to be transmitted down the line to other nodes. Many nodes can thus share the same main signal on the same main optic fiber using these couplers.

Similarly the return signal from each node can be placed on the same main optic fiber such that each node can be in contact with every other node up and down the main optic fiber and with optical sending or sensing equipment at the ends of the main fiber optic line.

OBJECTS OF THE INVENTION

It is an object of the invention to provide a passive optical data network having a bus with a large number of nodes.

It is also an object of the invention to provide light weight optical couplers in an optical network.

It is also an object of the invention to provide compact optical couplers in an optical network.

It is also an object of the invention to provide two way communications with large numbers of nodes on a passive optical data bus.

It is a further object of the invention to limit optic signal loses at each coupler in the network.

Other objects, advantages and novel features of the present invention will become apparent from the following detailed description of the invention when considered in conjunction with the accompanying drawing.

DETAILED DESCRIPTION OF THE PREFERRED EMBODIMENT

Figure 1:
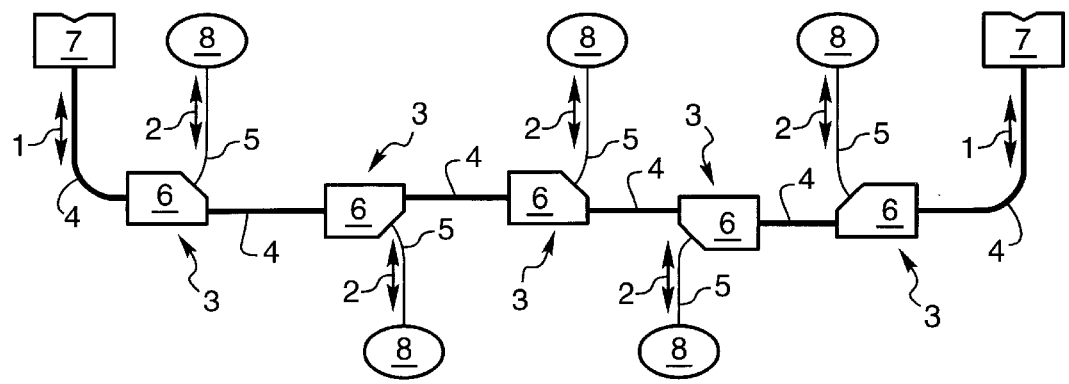
FIG. 1 is a schematic of a multiport network using bidirectional passive optical couplers.

FIG. 1 shows a fiber optic data network having a main optic fiber data bus 4 (heavy line) with bidirectional main light signals 1 traveling thereon. At junctions 3 there are bidirectional passive couplers 6, which split out a small portion of the main light signal 1 from the main fiber optic data bus 4 providing bidirectional branch light signals 2 on branch optic fibers 5 which travel to and from nodes 8. If the couplers at the junctions 3 only split off on the order of one percent of the main light signal 1 at each junction 3 then on the order of 50 junctions will diminish the main light signal by about 64 percent leaving the signal strength at about 34 percent of the original main light signal 1 at the end of the main optic fiber data bus 4.

Each junction 3 can receive branch light signals 2 from nodes 8 and split the branch light signals 2 into predetermined portions such as two equal portions for sending half in one direction on the main fiber optic data bus 4 and half the other direction.

Thus all nodes 8 can send and receive light signals to all other nodes 8 and to or from equipment 7. Similarly equipment 7 can send and receive light signals to or from all the nodes 8 and to other equipment 7.

Each branch optic fiber 5 leads to a node 8 which can be a sensor, actuator, computer, telephone or any other device which sends and/or receives information.

Equipment 7 at the end of the main fiber optic data bus 4 can be recording equipment, instrumentation, a controller, a computer, a telephone, instrumentation or any other equipment that receives and/or sends signals on the main fiber optic data bus 4.

Such a fiber optic network can be used for two way communications between sensors and controllers in aircraft, rockets, satellites and other vehicles, for telephone systems, computer networks or other communications systems, or for any other information system network.

Other examples of uses of the multiport network using bidirectional passive optical couplers are for bridges between two networks or a test/maintenance tap in a working bus.

Figure 2:
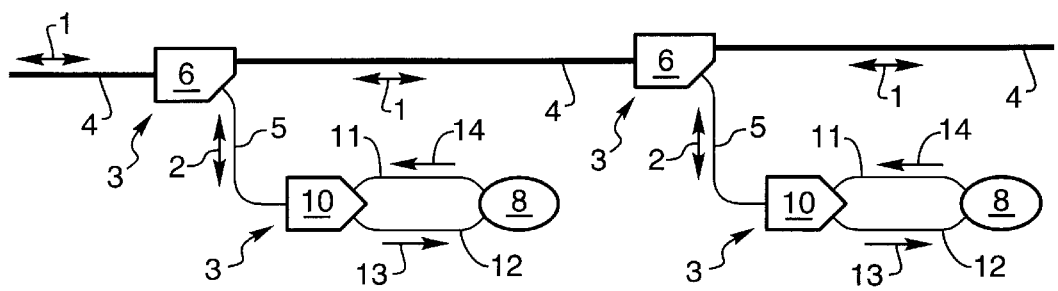
FIG. 2 is a schematic of a multiport network using bidirectional passive optical couplers and passive unidirectional to bidirectional couplers.

FIG. 2 shows a variation of the network in FIG. 1 wherein the branch light signal 2 enters a passive unidirectional to bidirectional passive optical coupler 10 before reaching node 8. In this embodiment the branch light signal 2 going to node 8 is split out as received light signal 13 on receive optic fiber 12 so that a light signal goes to a receiving portion, not shown, of the node 8 where it is transduced and used as required. The node 8 has a light producing transducer, not shown, for sending light signals 14 to the network. Transmit optic fiber 11 carries transmitted signal 14 to the passive unidirectional to bidirectional passive coupler 10 for introduction to the branch optic fiber 5 and then to the main optic fiber data bus 4 through bidirectional coupler 6.

Figure 3:
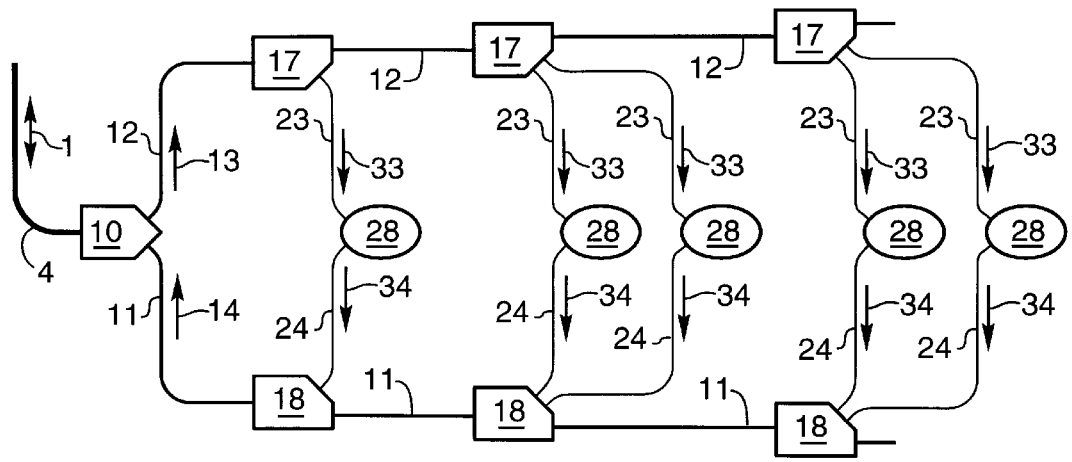
FIG. 3 is a schematic of a multiport network using passive unidirectional to bidirectional optical couplers, passive combiner optical couplers and passive splitter optical couplers.

FIG. 3 shows a multiport network using passive unidirectional to bidirectional passive optical couplers 10 to bridge between a single optic fiber bidirectional bus network having main optical fiber data bus 4 with two-way light signals 1 and a twin bus network having optic fibers 11 and 12 supporting twin bus nodes 28.

The main light signal 1 is split in a passive unidirectional to bidirectional passive optic coupler 10 into a received light signal 13 on receive optic fiber 12 which is in turn subdivided by splitters 17 taking a fraction of the received light signal 13 off of the receive optic fiber 12 and sending that portion split off as branch received light signal 33 to node 28 on branch receive optic fiber 23. Nodes 28 send branch transmitted light signals 34 on branch transmit optic fiber 24 to passive optic combiners 18 which combine the branch transmit light signals 34 from the nodes 28 onto transmit optic fiber 11 which carries the transmit light signals 14 to the passive unidirectional to bidirectional passive optic coupler 10 for sending the transmit light signal out on the main optic fiber data bus 4 as part of the main light signal 1. Thus a bidirectional main fiber optic data bus 4 is connected to a unidirectional data bus network having a transmit optic fiber 11 and a receive optic fiber 12.

The invention should not be thought of as limited to the combinations of networks shown here. The disclosed constituent parts may be combined in many different ways for constructing networks for different purposes.

Bidirectional couplers 6 as, shown in FIGS. 1 and 2, may be any one of several means for splitting out a small portion of the light signal 1 on fiber optic 4 to send light signal 2 out on fiber optic 5.

Figure 4:
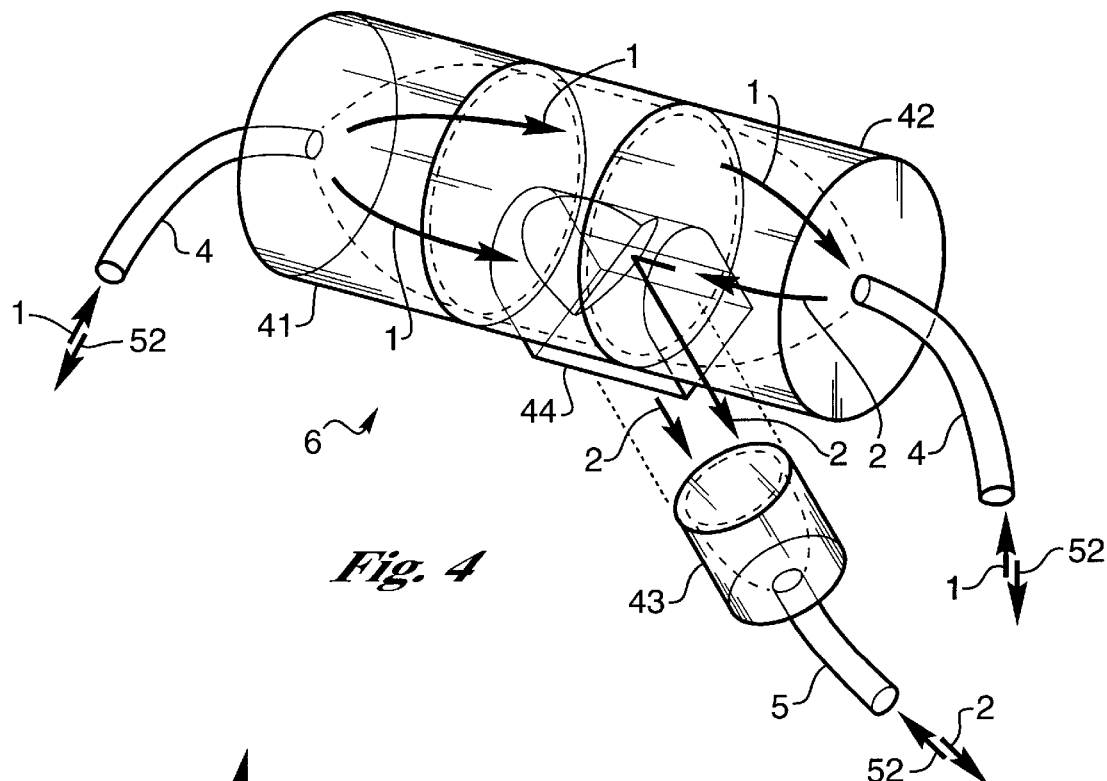
FIG. 4 is a passive optical coupler with a portion of the light signal removed.

As shown in FIG. 4 a bidirectional passive coupler 6 is used to split out a small portion 2 of main light signal 1 from the main optic fiber 4 to branch optic fiber 5, as shown in FIGS. 1 and 2. This embodiment shows GRIN lens 41 receiving main light signal 1. A mirror 44 inserted partly into the beam path of the main light signal 1 reflects part of that signal to GRIN lens 43 which sends branch light signal 2 onto branch optic fiber 5. The balance of the main light signal 1 is transmitted past the mirror 44 to GRIN lens 42 and continues traveling down main optic fiber data bus 4.

The two way branch light signal 52 going toward the bidirectional coupler 6 on branch fiber 5 is split by mirror 44 such that part of the branch light signal 52 goes to GRIN 41 and part to GRIN lens 42. Thus branch light signal 52 is transmitted to all points on the main optic fiber data bus 4.

For details of the coupler shown in FIG. 4 see patent applications Ser. Nos. 08/532,194 now U.S. Pat. No. 5,666,448 and 08/532,195 both filed on Sep. 22, 1995. These applications are attached hereto and hereby made a part hereof and incorporated herein by reference. These applications show one means but not the only means of splitting a portion of a light signal out of a main light signal on an optical fiber.

Figure 5:
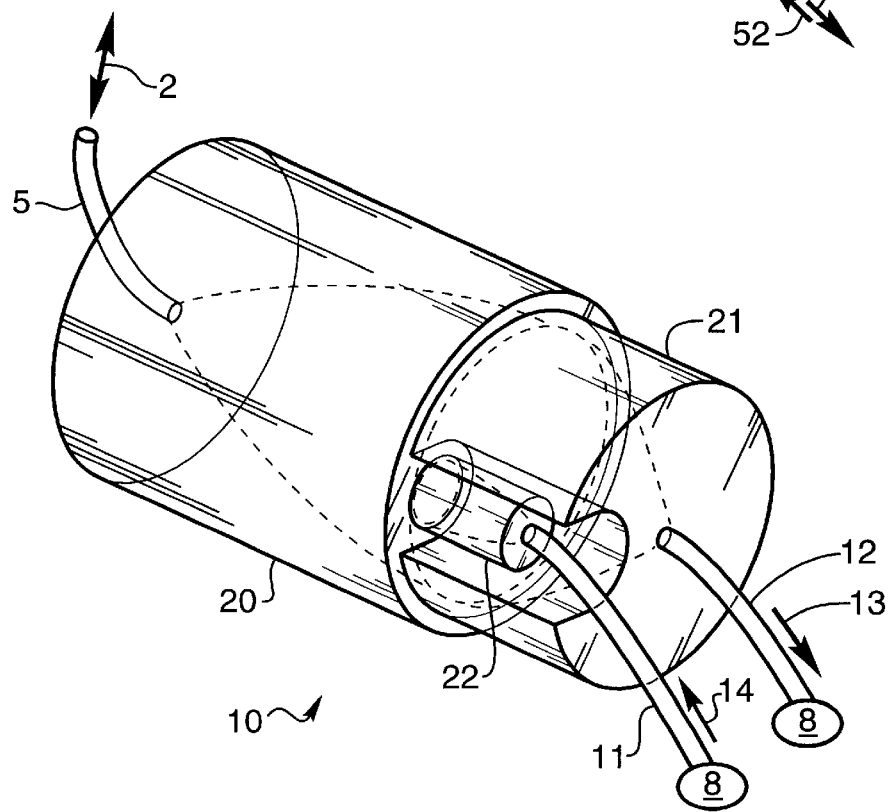
FIG. 5 is a passive optical coupler with a portion of the signal removed and a return signal input.

An embodiment of the passive unidirectional to bidirectional passive coupler 10 is shown in FIG. 5 and described and shown in greater detail in U.S. patent application Ser. No. 08/842,310, filed on Apr. 24, 1997. This patent application is attached hereto and made a part hereof by reference.

FIG. 5 in conjunction with the network shown in FIG. 2 shows the branch optic fiber 5 carrying two way branch light signals 2 to and from a receiving GRIN lens 20. Most of the incoming light 2 on optic fiber 5 incident on receiving GRIN lens 20 is directed to focusing GRIN lens 21 which focuses the light into receive optic fiber 12 which sends the received light signal 13 to a device, not shown, in node 8. A transmit fiber optic 11 carries transmitted light signal 14 from a device, not shown, in node 8 to transmitting GRIN lens 22 which sends all the transmitted light through receiving GRIN lens 20 to branch optic fiber 5 which is connected to the main optic fiber 4 in the network through coupler 6.

FIG. 3 shows the passive unidirectional to bidirectional optical passive coupler 10 sending main light signal 1 on optic fiber 4 onto optic fiber 12 as the received light signal 13. Passive unidirectional to bidirectional optical passive coupler 10 also receives the transmitted signal 14 on optic fiber 11 and transmits it to optic fiber 4 as main signal 1. Thus passive unidirectional to bidirectional optical passive coupler 10 splits the singular optical bus into a typical two bus system. This allows the use of current configurations of transmitter and receiver sets on single bus duplex or full duplex networks.

Figure 6:
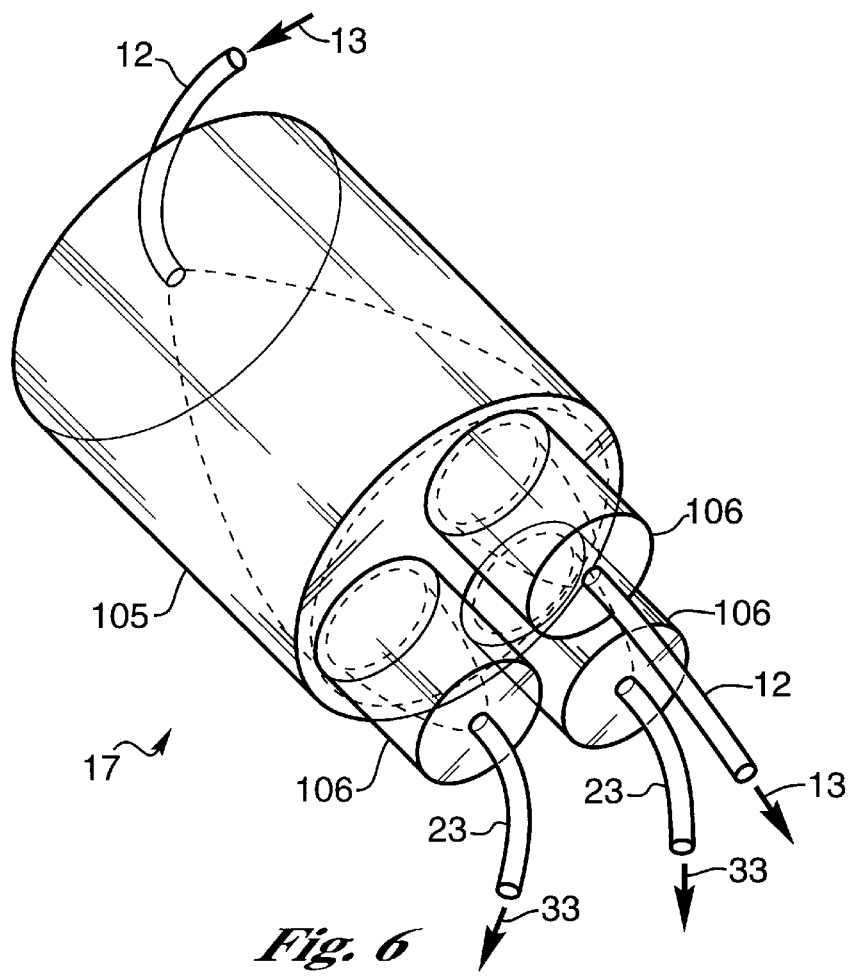
FIG. 6 is a perspective view of a fiber optic "T" coupler combiner which can be used in a network.

A coupler such as the Fiber Optic "T" Coupler Combiner, shown generally as the passive optical splitter 17 in FIG. 6, can be used in networks like those shown in FIGS. 1, 2 and 3. FIG. 6 in conjunction with FIG. 3 shows receive fiber optic 12 carrying received light signal 13 into GRIN lens 105 which splits the light into two or more parts in GRIN lenses 106 sending branch received light signals 33 on fiber optic 23 to node 28 and sending a portion of received light signal 13 on fiber optic 12 to the next passive optical splitter 17.

As may be readily seen the Fiber Optic "T" Coupler Combiner can also be used as passive optical combiner 18 in FIG. 3.

For details of the Fiber Optic "T" Coupler Combiner see U.S. patent application Ser. No. 08/839,993, filed on Apr. 24, 1997, attached hereto, made a part hereof and incorporated herein by reference.

Figure 7:
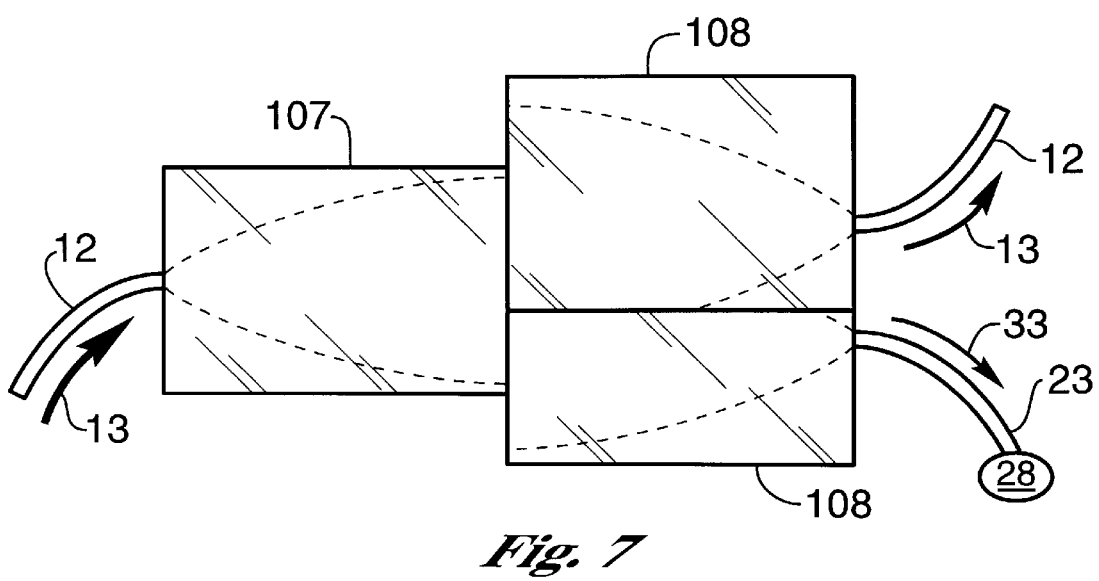
FIG. 7 is a perspective view of a fiber optic "T" coupler in-line splitter which can be used in a network.

Alternatively a coupler such as the Fiber Optic "T" Coupler In-Line Splitter, shown generally as the passive optical splitter 17 in FIG. 7, can be used in networks like those shown in FIGS. 1, 2 and 3. FIG. 7 in conjunction with FIG. 3 shows receive fiber optic 12 carrying received light signal 13 into GRIN lens 107 which splits the light into two or more parts in GRIN lenses 108 sending branch received light signals 33 on fiber optic 23 to node 28 and sending a portion of received light signal 13 on fiber optic 12 to the next passive optical splitter 17.

As may be readily seen the Fiber Optic "T" Coupler In-Line Splitter can also be used as passive optical combiner 18 in FIG. 3.

For details of the Fiber Optic "T" Coupler In Line Splitter see U.S. patent application Ser. No. 08/840,005, filed on Apr. 24, 1997, now U.S. Pat. No. 5,761,357, attached hereto, made a part hereof and incorporated herein by reference.

In another embodiment of the invention the passive unidirectional to bidirectional passive optic coupler 10 in FIG. 2 can attach a branch optic fiber 5 to multiple nodes 28 as in FIG. 3. Thus FIG. 3 can be shown with the branch optic fiber 5 of FIG. 2 replacing the main optic fiber data bus 4 of FIG. 3.

Many other network variations may be devised using various combinations of connectors in an optically coupled network.

Many types of couplers other than those shown may be used at the junctions of the optically coupled network.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An optical multiport network comprising:
   a main optic fiber data bus for bidirectionally transporting optical signals;

a plurality of branch optic fibers for bidirectionally transporting optical signals connected to the main optic fiber data bus;

a plurality of bidirectional passive optic couplers on the main optic fiber data bus for connecting the main optic fiber data bus to the branch optic fibers such that all optical signals on each of the branch optic fibers are transmitted to all the other branch optic fibers.

2. An optical multiport network as in claim 1 wherein:

the bidirectional passive optic couplers transfer approximately one percent of the optical signal from the main optic fiber data bus to the branch optic fibers.

3. An optical multiport network as in claim 1 wherein:

the bidirectional passive optic couplers transfer a portion of the optical signal in one direction and the remainder of the optical signal in the other direction on the main optic fiber data bus.

4. An optical multiport network as in claim 2 wherein:

the bidirectional passive optic couplers transfer a portion of the optical signal in one direction and the remainder of the optical signal in the other direction on the main optic fiber data bus.

5. An optical multiport network comprising:

(a) a main optical fiber data bus for bidirectionally transporting optical signals;

(b) a plurality of branch optic fibers for bidirectionally transporting optical signals connected to the main optic fiber data bus; and (c) a plurality of bidirectional passive optic couplers on the main optic fiber data bus for connecting the main optic fiber data bus to the branch optic fibers such that all optical signals on each of the branch optic fibers are transmitted to all the other branch optic fibers;

wherein a unidirectional to bidirectional passive optical coupler is attached to at least one branch optic fiber to transform the bidirectional optical signals on the branch optic fiber to a unidirectional receive optical signal on a receive optic fiber and a unidirectional transmit optical signal on a transmit optic fiber.

6. An optical multiport network comprising:

(a) a main optical fiber data bus for bidirectionally transporting optical signals;

(b) a plurality of branch optic fibers for bidirectionally transporting optical signals connected to the main optic fiber data bus; and (c) a plurality of bidirectional passive optic couplers on the main optic fiber data bus for connecting the main optic fiber data bus to the branch optic fibers such that all optical signals on each of the branch optic fibers are transmitted to all the other branch optic fibers;

wherein:

(d) the bidirectional passive optic couplers transfer approximately one percent of the optical signal from the main optic fiber data bus to the branch optic fibers; and a unidirectional to bidirectional passive optical coupler is attached to at least one branch optic fiber to transform the bidirectional optical signals on the branch optic fiber to a unidirectional receive optical signal on a receive optic fiber and a unidirectional transmit optical signal on a transmit optic fiber.

7. An optical multiport network as in claim 6 wherein:

at least one passive optical splitter attached to the receive optic fiber splits out a portion of the received optical signal thereon and connects it to a branch received optic fiber.

8. An optical multiport network as in claim 7 wherein:

at least one passive optical combiner attached to a branch transmit optic fiber the transmit optic fiber guides the transmit optical signal thereon and connects it to the branch optic fiber.

9. An optical multiport network as in claim 6 wherein:

at least one passive optical combiner attached to a branch transmit optic fiber the transmit optic fiber guides the transmit optical signal thereon and connects it to the branch optic fiber.

10. An optical multiport network comprising:

(a) a main optical fiber data bus for bidirectionally transporting optical signals;

(b) a plurality of branch optic fibers for bidirectionally transporting optical signals connected to the main optic fiber data bus; and (c) a plurality of bidirectional passive optic couplers on the main optic fiber data bus for connecting the main optic fiber data bus to the branch optic fibers such that all optical signals on each of the branch optic fibers are transmitted to all the other branch optic fibers;

wherein:

(d) the bidirectional passive optic couplers transfer a portion of the optical signal in one direction and the remainder of the optical signal in the other direction on the main optic fiber data bus; and (e) a unidirectional to bidirectional passive optical coupler is attached to at least one branch optic fiber to transform the bidirectional optical signals on the branch optic fiber to a unidirectional receive optical signal on a receive optic fiber and a unidirectional transmit optical signal on a transmit optic fiber.

11. An optical multiport network comprising:

(a) a main optical fiber data bus for bidirectionally transporting optical signals;

(b) a plurality of branch optic fibers for bidirectionally transporting optical signals connected to the main optic fiber data bus; and (c) a plurality of bidirectional passive optic couplers on the main optic fiber data bus for connecting the main optic fiber data bus to the branch optic fibers such that all optical signals on each of the branch optic fibers are transmitted to all the other branch optic fibers;

wherein:

(d) the bidirectional passive optic couplers transfer approximately one percent of the optical signal from the main optic fiber data bus to the branch optic fibers;

(e) the bidirectional passive optic couplers transfer a portion of the optical signal in one direction and the remainder of the optical signal in the other direction on the main optic fiber data bus; and (f) a unidirectional to bidirectional passive optical coupler is attached to at least one branch optic fiber to transform the bidirectional optical signals on the branch optic fiber to a unidirectional receive optical signal on a receive optic fiber and a unidirectional transmit optical signal on a transmit optic fiber.

12. An optical multiport network comprising:

a main optic fiber data bus for bidirectionally transporting optical signals;

at least one unidirectional to bidirectional passive optical coupler attached to the main optic fiber data bus to transform the bidirectional optical signals on the main optic fiber data bus to a unidirectional receive optical signal on a receive optic fiber and a unidirectional transmit optical signal on a transmit optic fiber.

13. An optical multiport network comprising:
(a) a main optic fiber bus for bidirectionally transporting optical signals; and
(b) at least one unidirectional to bidirectional passive optical coupler attached to the main optic fiber data bus to transform the bidirectional optical signals on the main optic fiber data bus to a unidirectional receive optical on a receive optic fiber and a unidirectional transmit optical signal on a transmit optic fiber;

wherein:
(c) at least one passive optical splitter is attached to the receive optic fiber for splitting out a portion of the unidirectional receive optical signal thereon to a branch receive optic fiber; and
(d) at least one passive optical combiner is attached to the transmit optic fiber for combining the unidirectional transmit optical signals from a branch transmit optic fiber onto the transmit optic fiber.

* * * * *